Sept. 14, 1926.  W. LIENHARD ET AL  1,599,826
APPARATUS FOR EXTINGUISHING FIRES IN COTTON BALES
Filed August 29, 1925   2 Sheets-Sheet 1
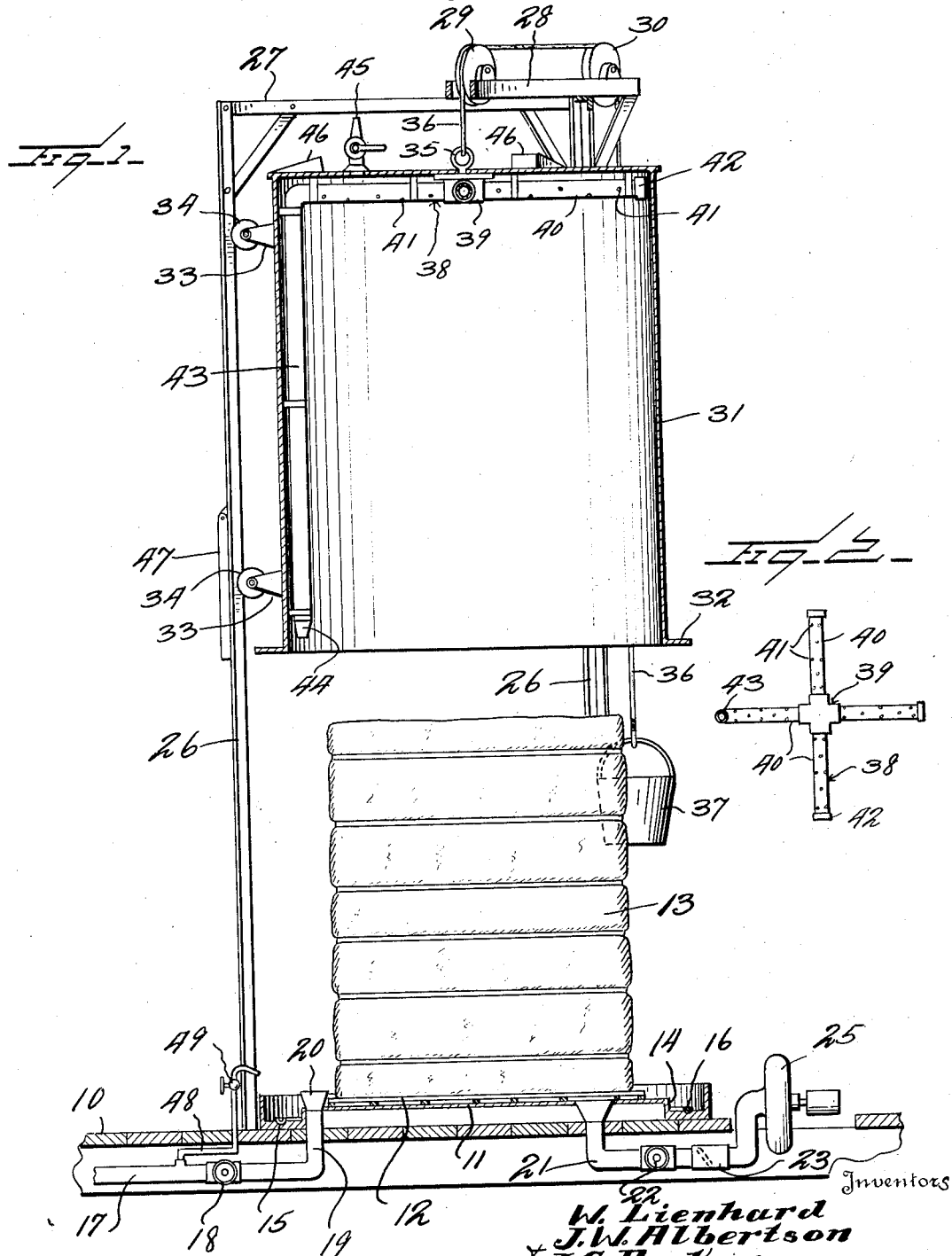

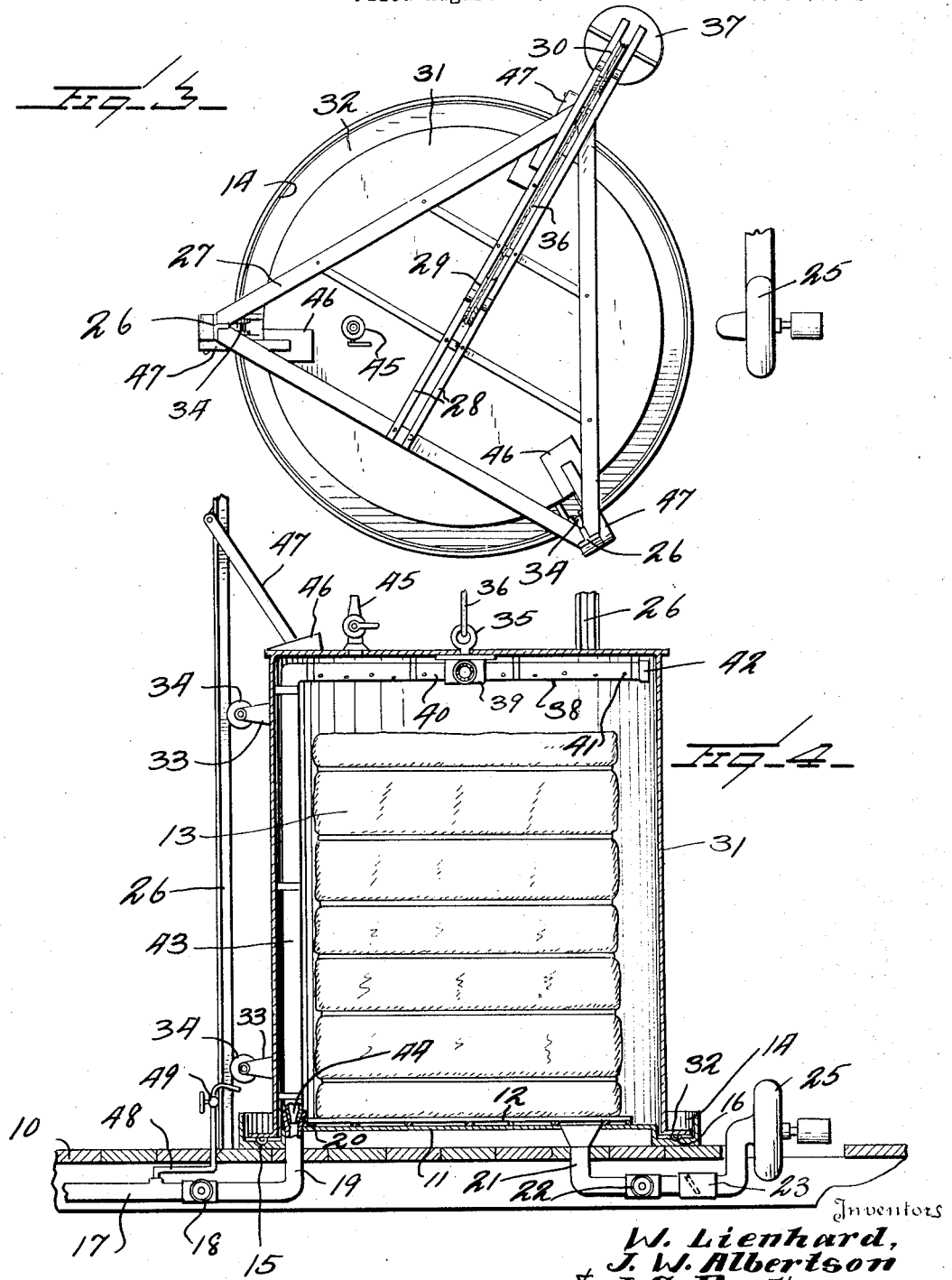

Patented Sept. 14, 1926.

1,599,826

UNITED STATES PATENT OFFICE.

WILLIAM LIENHARD, JAMES W. ALBERTSON, AND JOHN G. DECKER, OF MISSION, TEXAS.

APPARATUS FOR EXTINGUISHING FIRES IN COTTON BALES.

Application filed August 29, 1925. Serial No. 53,318.

This invention relates to apparatus for extinguishing fires in cotton bales whether these fires be internal or external.

An important object of the invention is to provide a device of this character which will operate rapidly and into which the cotton bale may be readily inserted.

A further and more specific object of the invention is to provide a container in which the cotton bale may be placed together with means for first subjecting the bale while within the container to the quenching action of water and then to the extinguishing action of a vacuum.

A still further object of the invention is to provide a device of this character which may be readily and cheaply produced and operated and which will be a general improvement in the art.

These and other objects we attain by the construction shown in the accompanying drawings, wherein for the purpose of illustration is shown a preferred embodiment of our invention and wherein:—

Figure 1 is a view in section of a fire extinguishing apparatus constructed in accordance with our invention, the parts being shown with a bale in position and ready to be sealed by lowering of the hood;

Figure 2 is a view of the rosette employed for sprinkling the bale and for filling the container;

Figure 3 is a plan view of the apparatus;

Figure 4 is a view similar to that shown in Figure 1 but with the parts in position for performing the extinguishing operation.

Referring now more particularly to the drawings, the numeral 10 designates a suitable base which may consist of the floor of a warehouse or platform upon which cotton bales are disposed. Arranged upon this platform is a bale support comprising a base plate 11 upon which is arranged a perforated rack 12 adapted to receive and support a cotton bale 13. The plate is provided about its edges with a gutter 14, the center of which is provided with a gasket seat 15 for the reception of a gasket 16 of any suitable character.

A water supply pipe 17 having arranged therein a valve 18 is preferably disposed beneath the base 10 and has an upturned end portion 19 projecting upwardly through the base 10 and base plate 11 and is provided upon its upper end arranged above the base plate with a funnel mouth 20, the purpose of which will presently appear. A waste pipe 21 having arranged therein a valve 22 and a check valve 23 opens through the base plate 11 at its intake end and at its exhaust end communicates with an exhaust pump 25 which may be of any suitable character.

Arranged in spaced relation about the base plate 11 and extending vertically upward from the base 10 are T iron supports 26, the upper ends of which are connected and suitably braced to one another, as indicated at 27. These braces combine to form a top structure to which is secured a pair of supporting rails 28, the ends of which project to one side of the top structure. Between these rails are rotatably mounted a pair of sheaves 29 and 30, the sheave 29 being arranged so that its perimeter approximates the center of the base plate 11 and the sheave 30 being arranged between the extended end portions of the rails. Between the supports 26 is arranged an open bottom drum 31, the bottom and side walls of which are provided with an outstanding flange 32 and the side walls of which are provided with outwardly projecting mountings 33 having rollers 34 engaging the stem of the T iron supports so that the drum is guided from these supports. The closed top of the drum is provided with a ring 35 or other suitable means for attaching thereto a cable 36 which passes over the sheaves 29 and 30 and has attached to its free end a counter-balanced weight 37 rendering manual manipulation of the drum to elevate or lower the same possible.

Arranged in the top of the drum and supported therefrom is a rosette 38 comprising a central header 39 and a plurality of arms 40 radiating from this header provided at spaced points with discharge openings 41. The outer ends of all but one of the arms 40 are closed, as at 42, and this arm communicates with a vertically extending pipe or conduit 43, the lower end of which is provided with a taper 44 corresponding to the taper of the funnel 20. This pipe aligns with the funnel and when the drum is lowered fits into the funnel and has a relatively tight joint therewith. The upper wall of the drum is provided with a valve 45, the purpose of which will presently appear. The upper end of the drum is also provided with a plurality of shoulders or wedges 46 which, when the drum is in lowered position, receive the ends of levers 47 pivoted to the uprights 26 to assist in maintaining the drum in lowered position. Means are provided for supplying water to the trough 14 comprising a conduit 48 communicating with the conduit 17 and having a valve 49 arranged therein. This conduit has its upper end arranged to discharge into the trough 14 without interfering with movement of the flange 32 of the drum into and out of this trough.

In the use of the device, a cotton bale in which fire is present or suspected is placed upon the rack 12 and the drum 31 lowered into position so that its flange 32 rests upon the gasket 16 in the trough 14. The drum is secured in its lowered position by the levers 47 and in this position, the conduit 17 is in communication with the conduit 43. At this time, the valve 22 is closed and the valves 18 and 45 are opened. The valve 18 permits water to pass upwardly through the conduit 43 to be discharged by the rosette downwardly upon the bale, air escaping from the drum through the valve 45. Water is preferably admitted to the trough 14 to cover the flange 32 and insure an air tight seal at this point. The inlet of water is continued until the drum is filled after which the pump 25 is started and the valves 45 and 18 closed while the valve 22 is opened. Action of the pump continues until the water is exhausted from the drum and since the drum is sealed by the closing of the valves 18 and 45, a vacuum will result within the drum of sufficient intensity to insure that after a short period, fire in the bale will fail for want of air to support combustion. After the proper period, the vacuum is released by opening the valve 45 and the levers 47 are disengaged so that the drum may be raised and the bale removed at which time the apparatus is ready for repetition of the foregoing operation.

It will be obvious that a device of this character provides a ready and efficient means for extinguishing the external or internal fires in cotton bales and may be economically produced and maintained in operation. It will furthermore be obvious that the construction hereinbefore set forth is obviously capable of a certain range of change and modification without materially departing from the spirit of the invention and we accordingly do not limit ourselves to such specific structure except as hereinafter claimed.

We claim:—

1. In apparatus for extinguishing fires in cotton bales, a container of capacity to house a cotton bale and having an opening of sufficient size to receive said bale, means for sealing said container, means for introducing water to the container to fill the same and means for exhausting the water from the container in its sealed state to produce a vacuum therein.

2. Means for extinguishing fires in cotton bales and the like comprising a base plate upon which the bale may be arranged, means coacting with the base plate to produce a sealed housing enclosing the bale and means for introducing water to the housing and permitting escape of air therefrom and means for exhausting water from the casing after filling of the casing to thereby produce a vacuum within the casing.

3. In a device of the type described, a base plate, a drum movable toward and away from the base plate, means for sealing the drum to the base plate, means for introducing water to the upper end of the drum, a manually operable valve in the upper end of the drum and an exhaust pump communicating with the drum through the base plate when the drum and base plate are in sealing position.

4. In a device of the type described, a base plate, a drum movable toward and away from the base plate, means for sealing the drum to the base plate, means for introducing water to the upper end of the drum, a manually operable valve in the upper end of the drum and an exhaust pump communicating with the drum through the base plate when the drum and base plate are in sealing position, the base plate being provided about its edges with a gutter, the drum having a flange entering the gutter, the gutter having a gasket engaging the flange to effect a seal therewith.

5. In a device of the type described, a base plate, a drum movable toward and away from the base plate, means for sealing the drum to the base plate, means for introducing water to the upper end of the drum, a manually operable valve in the upper end of the drum and an exhaust pump communicating with the drum through the base plate when the drum and base plate are in sealing position, the base plate being provided about its edges with a gutter, the drum having a flange entering the gutter, the gutter having a gasket engaging the flange to effect a seal therewith and means for providing a water seal about the flange within the gutter.

6. In a device of the type described, a base plate, a drum movable toward and away from the base plate, means for sealing the drum to the base plate, means for introducing water to the upper end of the drum including a rosette secured within the drum at the upper end thereof, a conduit directed through the base plate and in communication with a source of water, said conduit having a conical upper end and a conduit communicating with the rosette at its upper end and having at its lower end the tapered section for coaction with said pipe when the drum is in sealing engagement with the base plate.

7. In a device of the type described, a base plate, a drum movable toward and away from the base plate, means for sealing the drum to the base plate, means for introducing water to the upper end of the drum, a manually operable valve in the upper end of the drum, an exhaust pump communicating with the drum through the base plate when the drum and base plate are in sealing position, a supporting structure for the drum and means upon the supporting structure for locking the drum against movement away from the base plate when in engagement with the base plate.

8. The method of extinguishing fires in cotton bales consisting in placing the bale within a container, filling the container with water, sealing the same and exhausting the water from the container to produce a vacuum therein.

In testimony whereof we hereunto affix our signatures.

WILLIAM LIENHARD.
JAS. W. ALBERTSON.
JOHN G. DECKER.